2,751,379
Patented June 19, 1956

2,751,379
PREPARATION OF STEROIDAL 11α-HYDROXY COMPOUNDS

Franz Sondheimer, Mexico City, Mexico, Carl Djerassi, Birmingham, Mich., and George Rosenkranz and Octavio Mancera, Mexico City, Mexico, assignors to Syntex S. A., Mexico City, Mexico, a corporation of Mexico No Drawing. Application July 28, 1953,
Serial No. 370,857

16 Claims. (Cl. 260—239.55)

The present invention relates to a novel method for the preparation of cyclopentanophenanthrene derivatives. More particularly, the present invention relates to a novel method for the preparation of steroidal 11α-hydroxy compounds from the corresponding 11-keto compounds.

As is well known, the 11α-hydroxy compounds are valuable intermediates for the production of cortical hormones, for example, 11α-hydroxy progesterone which is produced biochemically from pregesterone, has by known bethods been utilized for the production of cortisone. Since the biochemical oxidation produces, in general, 11α-hydroxy compounds in many instances, it is desirable to have a method for producing these same compounds synthetically so that the compounds of the present invention are not only useful intermediates, as is well-known, but the present process also presents a useful method for preparing these known compounds.

It is well-known that most of the methods for the reduction of a keto group at position 11 of the steroidal molecule, as for example the reduction with lithium aluminum hydride, produces the corresponding 11β-hydroxy compounds. In the United States application of Sondheimer, Djerassi and Rosenkranz, Serial No. 335,586, filed February 6, 1953, now Patent No. 2,702,290, there has been described a method for the transformation of certain specific steroidal $\Delta^{8(9)}$-11-keto compounds into the corresponding saturated 11α-hydroxy compounds by treating the same with alkali metal in ammonia solution and in the presence of an alcohol. It was generally considered that this method was only suitable for the production of 11α-hydroxy saturated compounds from the corresponding $\Delta^{8(9)}$-11-keto compounds, particularly of the allo series at C–5.

In accordance with the present invention, the surprising discovery has been made that steroidal 11α-hydroxy compounds may be produced from the corresponding saturated 11-keto compounds irrespective of the configuration and other active positions in the molecule. Particularly, this surprising discovery has been made that the configuration at C–5 has no influence on the course of he present reaction and that the reaction of an 11-keto compound with sodium in an organic solvent such as anhydrous ethanol, anhydrous isopropanol, moist ethyl ether or moist benzene, produces in good yield the corresponding 11α-hydroxy compound whether or not the steroid belongs to the C–5 normal series or the C–5 allo series.

It has been further discovered in accordance with the present invention that other substituents may be present in the molecule and that other substituents, such as a keto group, may be protected from reaction with the reducing agent by the formation of a ketal, thereby making possible the selective reduction of the keto group at position 11.

The following equations illustrate typical examples of the application of the present method:

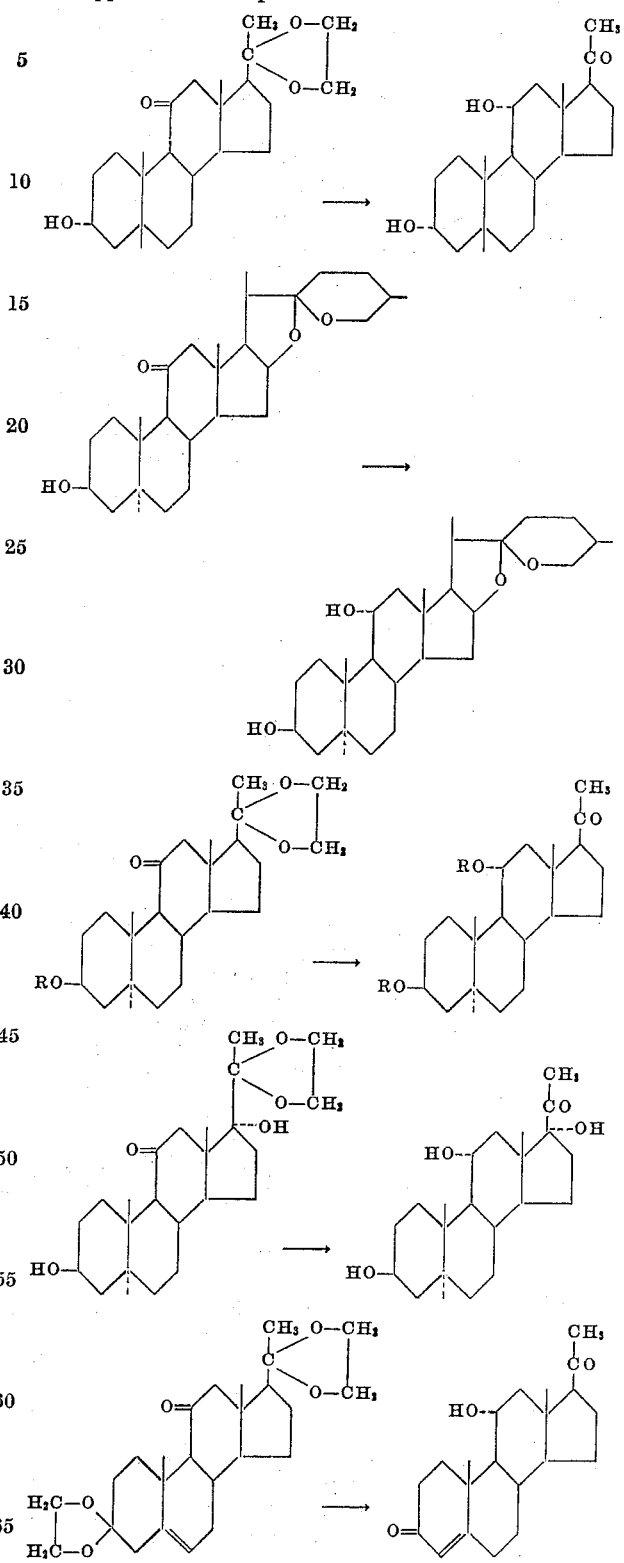

In practicing the method illustrated by the above equations, the steroidal 11-ketone is preferably dissolved in a suitable organic solvent such as absolute ethanol or isopropanol or a solvent such as ethyl ether or benzene and water. Sodium metal is then added in small portions and after the sodium is dissolved the mixture is cooled and water added in the case of the isopropanol or ethanol to decompose the sodium derivative formed. The steroid is then precipitated with more water. Where benzene and water or ether and water is used the organic layer is separated and evaporated to dryness to obtain the steroid product. The product is then purified and the crystalline precipitate, if a ketal, can then be treated as with acid to decompose the ketal. In any event, the corresponding 11α-hydroxy compound is produced in good yield. If the steroid possesses an esterified hydroxy group as is indicated by R in the above equations, then, preferably, the product is reesterified since the method produces to a certain extent a saponification of esterified hydroxy groups. Preferably R in the above equations represents the esterification residue of any acid normally used for the esterification of steroids alcohols, as for example, R may represent the residue of a lower fatty acid such as acetic or the residue of benzoic acid.

The above equations are intended to represent only typical examples of steroids and it is obvious that other substituents may be present on the basic molecule and other side chains may be present at 16 or 17.

The following specific examples serve to illustrate but are not intended to limit the present invention:

Example I 2 g. of the 20-monoethyleneketal of pregnane-3α-ol-11,20-dione were dissolved in 150 cc. of hot absolute ethanol and the solution was cooled to room temperature. Then 12 g. of finely divided sodium were added in small portions in such a way as to keep the solution gently boiling. When all the sodium had dissolved, the mixture was cooled and water was added to decompose the sodium ethylate and then an excess of water was added to precipitate the steroidal substance which was extracted with ether, washed with water to neutral, dried over sodium sulphate and evaporated to dryness. Recrystallization from acetone-hexane afforded the 20-ketal of pregnane-3α,11α-diol-20-one with a melting point of 197°–199° C., $[\alpha]_D +16°$ (chloroform).

1 g. of the 20-ethyleneketal of pregnane-3α,11α-diol-20-one was dissolved in 70 cc. of anhydrous acetone containing 100 mg. of p-toluenesulphonic acid and the mixture was kept for 24 hours at room temperature. It was then poured into water and the product was extracted with chloroform, washed several times with water, dried over sodium sulphate and evaporated to dryness. Recrystallization of the residue from acetone-hexane yielded 0.85 g. of pregnane-3α,11α-diol-20-one with a melting point of 178°–179° C., $[\alpha]_D +88°$ (chloroform).

Acetylation with acetic anhydride and pyridine by known methods afforded the corresponding diacetate with a melting point of 142°–144° C., $[\alpha]_D +61°$ (chloroform).

Example II

Following the method described in Example I for the reduction of the 20-monoethyleneketal of pregnane-3α-ol-11,20-dione, there was reduced 2 g. of 22-isoallospirostane-3β-ol-11-one acetate. The resulting product which was difficult to crystallize was directly acetylated by heating for one hour on the steam bath with 3 cc. of acetic anhydride and 2 cc. of pyridine. Isolation by routine methods gave 1.4 g. of 22-isoallospirostane-3β,11α-diol diacetate with a melting point of 172°–174° C., $[\alpha]_D -77°$ (chloroform), which was identical with an authentic sample.

Example III 2 g. of the 20-monoethyleneketal of allopregnane-3β-ol-11,20-dione acetate (the preparation of which is described in a paper by Djerassi, Batres, Romo and Rosenkranz, J. Am. Chem. Soc., 1952) was dissolved in 150 cc. of isopropanol and then treated in exactly the same way as described in Example I. After hydrolizing the ketal and reacetylating, there was obtained 1.25 g. of allopregnane-3β,11α-diol-20-one diacetate with a melting point of 169–171° C., $[\alpha]_D +43°$ (chloroform).

Example IV 2 g. of the 20-monoethyleneketal of allopregnane-3β,17α-diol-11,20-dione were dissolved in 200 cc. of ether and 50 cc. of water were added. This two-phase solution was treated, under strong stirring, with 12 g. of finely divided sodium which was added in small portions in the course of 3 hours. After all the sodium had dissolved, the organic layer was separated and washed with water until neutral, dried over sodium sulphate and evaporated to dryness. After hydrolizing the ketal thus obtained, 1.12 g. of allopregnane-3β,11α,17α-triol-20-one were obtained with a melting point of 250°–253° C.

Example V

Starting from 1 g. of Δ⁴-pregnene-3,11,20-trione (11-ketoprogesterone) there was prepared the 3,20-diethyleneketal by known methods, for example by the method described in the United States patent application of Dauben, Ringold and Loken, Serial No. 364,216, filed in the United States Patent Office June 25, 1953. Following the method described in Example IV, except that the ketal was dissolved in 200 cc. of benzene instead of 200 cc. of ether, 1.1 g. of Δ⁴-pregnene-11α-ol-3,20-dione (11α-hydroxyprogesterone) were obtained with a melting point of 163°–166° C., raised to 166°–167° C., by recrystallization.

We claim:

1. A method for the production of steroidal 11α-hydroxy compounds which comprises treating the corresponding steroidal 11-keto compounds with sodium metal in the presence of an organic solvent selected from the group consisting of lower alcohol solvents and moist organic solvents.

2. The method of claim 1 wherein the organic solvent is anhydrous ethanol.

3. The method of claim 1 wherein the organic solvent is anhydrous isopropanol.

4. The method of claim 1 wherein the organic solvent is moist ethyl ether.

5. The method of claim 1 wherein the organic solvent is moist benzene.

6. The method of claim 1 wherein the steroidal 11α-hydroxy compound has the normal configuration at C–5 and is produced from the corresponding C–5 normal 11-keto compound.

7. The method of claim 1 wherein the steroidal 11α-hydroxy compound possesses the allo configuration at C–5 and is produced from the corresponding 11-keto compound.

8. A method for the selective reduction of a steroidal 11-keto compound having additional keto groups in the molecule which comprises forming a ketal derivative of such additional groups, reducing the derivative with sodium metal in the presence of an organic solvent selected from the group consisting of lower alcohol solvents and moist organic solvents to prepare the corresponding steroidal 11α-hydroxy derivative and cleaving said derivative.

9. The method of claim 8 wherein the steroidal compound is a member of the pregnane series.

10. The method of claim 8 wherein the steroidal compound is a member of the allopregnane series.

11. The method of claim 8 wherein the steroidal compound is a member of the normal pregnane series.

12. A method for the preparation of pregnane-3α,11α- diol-20-one which comprises reducing the 20-monoethyleneketal of pregnane-3α-ol-11,20-dione with sodium metal in the presence of an alcoholic solvent, and thereafter cleaving the ketal group.

13. A method for the preparation of 22-isoallospirostan-3β,11α-diol, which comprises reducing 22-isoallospirostan-3β-ol-11-one with sodium metal in the presence of ethanol.

14. A method for the preparation of allopregnane-3β,11α-diol-20-one which comprises reducing the 20-monoethyleneketal of allopregnane-3β-ol-11,20-dione with sodium metal in the presence of isopropanol and thereafter cleaving the ketal group.

15. A method for the preparation of allopregnane-3β,11α,17α-trio-20-one which comprises reducing the 20-monoethyleneketal of allopregnane-3β,17α-diol-11,20-dione with sodium metal in the presence of moist ether and thereafter cleaving the ketal group.

16. A method for the preparation of $\Delta^4$-pregnene-11α-ol-3,20-dione which comprises reducing the 3,20-diethyleneketal of $\Delta^4$-pregnene-3,11,20-trione with sodium metal in the presence of moist benzene and thereafter cleaving the ketal groups.

No references cited.